United States Patent [19]

Scheurenbrand

[11] 4,416,303
[45] Nov. 22, 1983

[54] MOTOR VEHICLE FUEL TANK

[75] Inventor: Dieter Scheurenbrand, Ostfildern, Fed. Rep. of Germany

[73] Assignee: Daimler-Benz Aktiengesellschaft, Fed. Rep. of Germany

[21] Appl. No.: 236,507

[22] Filed: Feb. 20, 1981

[30] Foreign Application Priority Data

Feb. 20, 1980 [DE] Fed. Rep. of Germany ....... 3006254

[51] Int. Cl.³ .......................................... E03B 11/00
[52] U.S. Cl. .................................. 137/576; 123/516; 123/541; 123/514
[58] Field of Search ............... 123/518, 516, 510, 514, 123/541; 137/576, 563

[56] References Cited

U.S. PATENT DOCUMENTS 1,732,505 10/1929 Dawson .............................. 137/576
3,610,220 10/1971 Yamada et al. ...................... 123/518
4,279,232 7/1981 Schuster et al. .................... 123/514

Primary Examiner—Allan Cohan
Assistant Examiner—John A. Rivell
Attorney, Agent, or Firm—Craig & Burns

[57] ABSTRACT

A plastic fuel tank for motor vehicles, the fuel tank being formed in one piece with a surge tank disposed exteriorly of an interior of the fuel tank. The surge tank is separated from the fuel tank by means of a constriction and is connected with the fuel tank by means of an inlet opening. The surge tank extends out of the fuel tank toward the bottom thereof. In an area of the inlet opening the surge tank is provided with an indentation which forms a connecting passage or duct between the fuel tank and the surge tank. The connecting duct or passage is separate from the inlet opening and a fuel return line is arranged so as to discharge returned fuel into the connecting duct. The fuel return line is provided with a nozzle which, together with the indentation, results in the formation of an injector arrangement for injecting returned fuel and cooler fuel from the interior space of the fuel tank into the surge tank.

10 Claims, 1 Drawing Figure

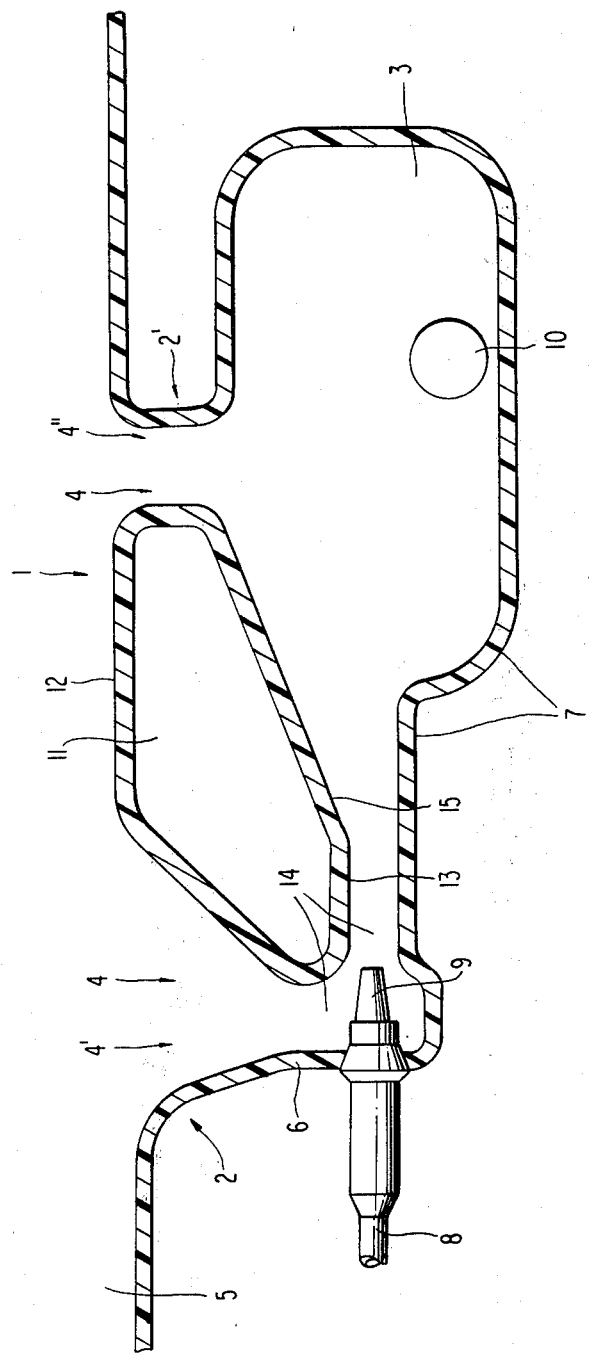

MOTOR VEHICLE FUEL TANK

The present invention relates to a fuel tank and, more particularly, to a one piece plastic fuel tank for motor vehicles, with the tank including a surge tank, disposed on an outside of an interior space of the fuel tank, with the surge tank being separated from an interior of the fuel tank by a constriction and connected with the fuel tank by an inlet opening, wherein the surge tank extends out of the fuel tank toward a bottom and the inlet is formed by an opening limited by the constriction.

With fuel tanks for motor vehicles, the fuel suction or inlet pipe is customarily disposed in an area of the surge tank if the surge tank forms the lowest point of the fuel tank. In this situation, the surge tank must contain a fuel reserve which ensures that, especially with a low fuel level, or through fluctuations of the level of the fuel in the fuel tank caused by centrifugal forces which occur, for example, during acceleration, braking or negotiation turns, a continuous fuel supply to the engine takes place over the fuel suction pipe so that no air may be drawn into the suction or inlet pipe.

In German Patent Application No. P 29 43 247.1 a plastic fuel tank for motor vehicles is proposed which fuel tank is adapted to supply fuel to a fuel-injected internal combustion engine. A disadvantage of the proposed plastic fuel tank construction resides in the fact that since the fuel tank is associated with a fuel-injected internal combustion engine, heated fuel that is brought back by the return line from the engine into the surge tank of the fuel tank may contain steam bubbles which, especially with a low fuel level, reach the fuel inlet or suction pipe of the fuel tank and cause a stopping of the internal combustion engine.

In Auslegeschrift No. 26 02 234, a fuel tank for a fuel-injected internal combustion engine is proposed with has an injector through which fuel is sucked or drawn in from the fuel tank into the surge tank as long as there is fuel in the fuel tank. If steam bubbles occur in the fuel, such bubbles are delfected from the inlet or suction area of the fuel tank, surrounded by a sieve, by means of additional deflector devices. A disadvantage of this proposed construction resides in the fact that it is relative expensive to manufacture the tank and mount it and, especially with respect to a plastic fuel tank, this proposed construction would require a complicated manufacturing process.

The aim underlying the present invention essentially resides in providing a plastic fuel tank for a motor vehicle which ensures a continuous fuel supply to an internal combustion engine of the vehicle in all situations and under all operating conditions of the motor vehicle.

In accordance with advantageous features of the present invention, the surge tank, in an area of the inlet opening, is provided with an indentation that forms a connecting passage between the fuel tank and the surge tank, which connecting passage is separate from the inlet opening. A fuel return pipe discharges into the connecting passage, with the fuel return pipe being in the form of a nozzle. The fuel return pipe together with the indentation results in the formation of a type of fuel injector.

By virtue of the above noted features of the present invention, with a fuel-injected internal combustion engine, the heated fuel that returns from the engine through the fuel return pipe is conveyed from the nozzle of the fuel pipe into the surge tank at a high speed thereby resulting in the existence of a vacuum or low pressure area at the mouth of the nozzle which is effective for cooler fuel to be drawn or sucked in from the fuel tank into the surge tank through the connecting passage. The cooler fuel mixes with the heated fuel in a mouth area of the connecting passage so that the fuel inlet or suction pipe may convey cool fuel to the engine.

Advantageously, the indentation is in the form of a diffuser-type development which enables the speed of the mixed fuel to be converted to a pressure which causes a more or less de-gassing of the fuel, i.e., any steam bubbles or the like which exist in the fuel would be deflected to the gradually expanding part of the connecting passage and over the inlet opening and directed to the fuel tank which may be vented in a conventional manner. In such a situation, the delivery volume of the injector formed by the connecting passage and the fuel return pipe and nozzle must be larger than a fuel volume of the surge tank.

In accordance with further advantageous features of the present invention, the indentation may be formed by a compressed area formed in two oppositely disposed walls of the surge tank and connected with each other so that the fuel tank with the surge tank and the injector may be manufactured in one piece in a simple manner with fuel expenses with respect to the manufacturing of the fuel tank and without requiring any additional assembly work.

In accordance with the present invention, the indentation is preferably disposed at a predetermined distance from the suction or inlet opening of the fuel suction or inlet opening of the fuel suction or inlet pipe so as to prevent steam bubbles or the like from reaching an area of the suction opening of the fuel inlet or suction pipe and causing a misfiring or missing of the engine due to an interruption in the fuel supply.

Accordingly, it is an object of the present invention to provide a fuel tank formed of a plastic material which avoids, by simple means, shortcomings and disadvantages encountered in the prior art.

Another object of the present invention resides in providing a plastic fuel tank for a motor vehicle which is simple in construction and therefore relatively inexpensive to manufacture and assemble.

A still further object of the present invention resides in providing a plastic fuel tank for a motor vehicle having a fuel injected internal combustion engine which ensures a cooling of fuel returned from the engine to the fuel tank prior to a re-feeding of the fuel back to the engine.

A still further object of the present invention resides in providing a plastic fuel tank for a motor vehicle equipped with a fuel-injected internal combustion engine which minimizes if not avoids the occurrences of any interruption in the supply of the fuel to the engine.

These and other objects, features, and advantages of the present invention will become more apparent from the following description when taken in connection with the accompanying drawing which shows, for the purposes of illustration only, one embodiment in accordance with the present invention, and wherein:

The single FIGURE of the drawing is a partial cross sectional view of a lower portion of a fuel tank equipped with a surge tank and injector constructed in accordance with the present invention.

Referring now to the single FIGURE of the drawing, according to this FIGURE, a lower section of a plastic fuel tank generally designated by the reference numeral 1, manufactured by a blowing process, includes a surge tank 3 formed, during the manufacturing of the fuel tank 1, at a lower point of the fuel tank 1 by means of a constriction generally designated by the reference numeral 2. The surge tank 3 is connected to or communicates with a fuel storage space defined by the interior of the fuel tank 1 through inlet openings generally designated by the reference numeral 4. A fuel return line 8 is disposed in a side wall 6 of the surge tank 3 at a small distance from a bottom wall 7 of the surge tank 3. The fuel return pipe 8 terminates in a nozzle 9, with the nozzle 9 extending into an interior of the surge tank 3.

A suction opening 10 of a fuel supply or suction pipe connected to the internal combustion engine (not shown) is disposed at a predetermined distance from a mouth of the nozzle 9. The suction opening 10 is disposed at a slight distance above the bottom wall 7 of the surge tank 3. An indentation 11 is provided in an area of the surge tank 3, with an upper wall 12 of the indentation 11 being located in an area of the inlet opening 4 so as to divide the inlet opening 4 into two individual openings generally designated by the reference numerals 4', 4''. The indentation 11 also includes a lower wall 13 which, with the correspondingly developed lower or bottom wall 7 of the surge tank 3 form a duct or connecting passage 14. The lower wall 13 is disposed directly upstream of the mouth of the nozzle 9, as viewed in a flow return direction of the fuel. The indentation 11 also includes a diffuser type expansion wall 15 connected to the lower wall 13, with the expansion wall 15 extending to the opening 4''.

During a manufacturing of the fuel tank 1, two oppositely disposed walls of the surge tank 3 may be compressed or squeezed inwardly so as to form the indentation 11.

The fuel tank 1 with the surge tank 3 and injector arrangement formed by the nozzle 9 and duct or connecting passage 14 operates in the following manner.

When a motor vehicle equipped with a fuel-injected internal combustion engine is operated, heated fuel is transported from the engine over the fuel return pipe 8 and the nozzle 9 and, at a high speed, flows from the mouth or opening of the nozzle 9 into the duct or connecting passage 14 of the surge tank 3. The returning fuel discharging from the nozzle 9 creates a sub-pressure or vacuum at the mouth of the nozzle 9 so that continuously cooler fuel is sucked from the storage space 5 of the fuel tank 1 through the opening 4' and into the duct or connecting passage 14. The cooler fuel mixes with the heated fuel so that, at the suction opening 10 of the fuel suction pipe, only cool fuel is transported to the internal combustion engine.

Any steam bubbles in the heated fuel which return through the fuel return pipe and nozzle 9 flow over the diffuser-type expansion wall 15 of the flow or connecting passage 14 and the opening 4'' and are deflected into the storage space 5 of the fuel tank 1 so that a cool bubble free fuel is obtained prior to reaching the suction opening 10.

While I have shown and described only one embodiment in accordance with the present invention, it is understood that the same is not limited thereto but is susceptible of numerous changes and modifications as known to one having ordinary skill in the art and I therefore do not wish to be limited to the details shown and described herein, but intend to cover all such modifications as are encompassed by the scope of the appended claims.

I claim:

1. A plastic fuel tank for motor vehicles, the fuel tank includes a surge tank disposed exteriorly of an interior space of the fuel tank, means for separating the surge tank from the fuel tank, and fuel return means, characterized in that a first means is provided for communicating the surge tank with the interior space of the fuel tank, a second means separate from the first means, is provided for communicating the interior space of the fuel tank with the surge tank, and in that the fuel return means and said second communicating means form an injector means for injecting fuel into the surge tank, the separating means is a constriction formed between the fuel tank and the surge tank, the second communicating means is an inlet opening defined by the constriction, the first means includes a connecting passage means formed in an area of the inlet opening between the interior space of the fuel tank and the surge tank, and in that the fuel return means discharges returned fuel in the area of the inlet opening into the connecting passage means.

2. A fuel tank according to claim 1, characterized in that the fuel return means includes a discharge nozzle for discharging return fuel into the connecting passage means.

3. A fuel tank according to claim 2, characterized in that the connecting passage means is formed by an indentation provided in the surge tank, the indentation is arranged in an area of the inlet opening and divides the inlet opening into two separate passages.

4. A fuel tank according to claim 3, characterized in that the surge tank extends downwardly and outwardly from a bottom wall of the fuel tank.

5. A fuel tank according to claim 4, characterized in that the fuel tank is made in one piece.

6. A fuel tank according to one claims 3, 4 or 5, characterized in that the indentation is formed by a compression of two oppositely disposed end connected walls of the surge tank.

7. A fuel tank according to claim 6, characterized in that a suction opening for a fuel supply means is arranged in the surge tank, and in that the suction opening is spaced from the indentation.

8. A fuel tank according to one of claims 3, 4 or 5, characterized in that the indentation includes a first wall portion disposed approximately parallel to a portion of a bottom wall of the surge tank so as to define a connecting passage, and a deflector wall portion leading to one of the separate passages of the inlet opening.

9. A plastic fuel tank for motor vehicles, the fuel tank includes a surge tank disposed exteriorly of an interior space of the fuel tank, means for separating the surge tank from the fuel tank, and fuel return means, characterized in that a first means is provided for communicating the surge tank with the interior space of the fuel tank, a second means separate from the first means, is provided for communicating the interior space of the fuel tank with the surge tank, and in that the fuel return means and said second communicating means form an injector means for injecting fuel into the surge tank, the fuel return means includes a discharge nozzle adapted to discharge returned fuel into the second communicating means.

10. A fuel tank according to claim 9, characterized in that the second communicating means includes a connecting passage means formed in an area of the first communicating means.

* * * * *